(12) United States Patent
Chang et al.

(10) Patent No.: US 8,412,492 B2
(45) Date of Patent: Apr. 2, 2013

(54) SYSTEM AND METHOD FOR FITTING FEATURE ELEMENTS USING A POINT-CLOUD OF AN OBJECT

(75) Inventors: Chih-Kuang Chang, Taipei Hsien (TW); Xin-Yuan Wu, Shenzhen (CN); Min Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 928 days.

(21) Appl. No.: 12/436,720

(22) Filed: May 6, 2009

(65) Prior Publication Data
US 2010/0063784 A1    Mar. 11, 2010

(30) Foreign Application Priority Data

Sep. 5, 2008    (CN) .......................... 2008 1 0304390

(51) Int. Cl.
*G06F 17/50* (2006.01)
(52) U.S. Cl. .......................................................... 703/1
(58) Field of Classification Search .................. 703/1
See application file for complete search history.

(56) References Cited

PUBLICATIONS

Suya You et al., "Urban site modeling from Lidar," 2003, LNCS 2669, Springer-Verlag, pp. 579-588.*
William B. Thompson et al., "Feature-based reverse engineering of mechanical parts," 1999, IEEE Transactions on Robotics and Automation, vol. 15, No. 1, pp. 57-66.*
"Re-engineering Point Clouds," 2003, auto-des-sys, pp. 1-12.*
Christoph Witzgall et al., "Recovering circles and spheres from point data," 2006, in Perspectives in Operations Research, pp. 393-413.*
F. Tarsha-Kurdi et al., "Joint combination of point cloud and DSM for 3D building reconstruction using airborne laser scanner data," 2007, 2007 Urban Remote Sensing Joint Event, seven pages.*
Yuan Luo et al., "3D Building Reconstruction from LIDAR Data," 2006, LNCS 3980, Springer-Verlag, pp. 431-439.*
"IQ-FormFit User's Guide," version 2, 2000, Integrated Quality Inc., 169 pages.*
H. Pottman et al., "Industrial geometry: recent advances and applications in CAD," 2005, Computer-Aided Design, vol. 37, pp. 751-766.*

* cited by examiner

*Primary Examiner* — Dwin M Craig
*Assistant Examiner* — Russ Guill
(74) *Attorney, Agent, or Firm* — Altis Law Group, Inc.

(57) ABSTRACT

A system and method for fitting feature elements is provided. The method first receives a point-cloud of an object from a point-cloud obtaining device and constructs a triangular mesh surface of the point-cloud. The method then determines a plurality of uppermost boundary points of the triangular mesh surface, and fits a feature element according to the uppermost boundary points. The method further creates the feature element, and outputs the feature element to a display.

18 Claims, 10 Drawing Sheets

SYSTEM AND METHOD FOR FITTING FEATURE ELEMENTS USING A POINT-CLOUD OF AN OBJECT

BACKGROUND

1. Technical Field

Embodiments of the present disclosure generally relate to systems and methods for processing point-clouds of objects, and more particularly to a system and method for fitting feature elements using a point-cloud of an object.

2. Description of Related Art

During the designing and manufacturing stage of three-dimensional products, error analysis is an important process. Usually, the error analysis is done by a computer by comparing a three-dimensional design drawing with feature elements fitted and created using a point-cloud which is obtained by scanning a physical object manufactured according to the three-dimensional design drawing. Knowing how to quickly and accurately fit the feature elements using the point-cloud during error analysis is an important task.

DETAILED DESCRIPTION

All of the processes described below may be embodied in, and fully automated via, function code modules executed by one or more general purpose computers or processors. The code modules may be stored in any type of computer-readable medium or other computer storage device. Some or all of the methods may alternatively be embodied in specialized computer hardware.

Figure 1:
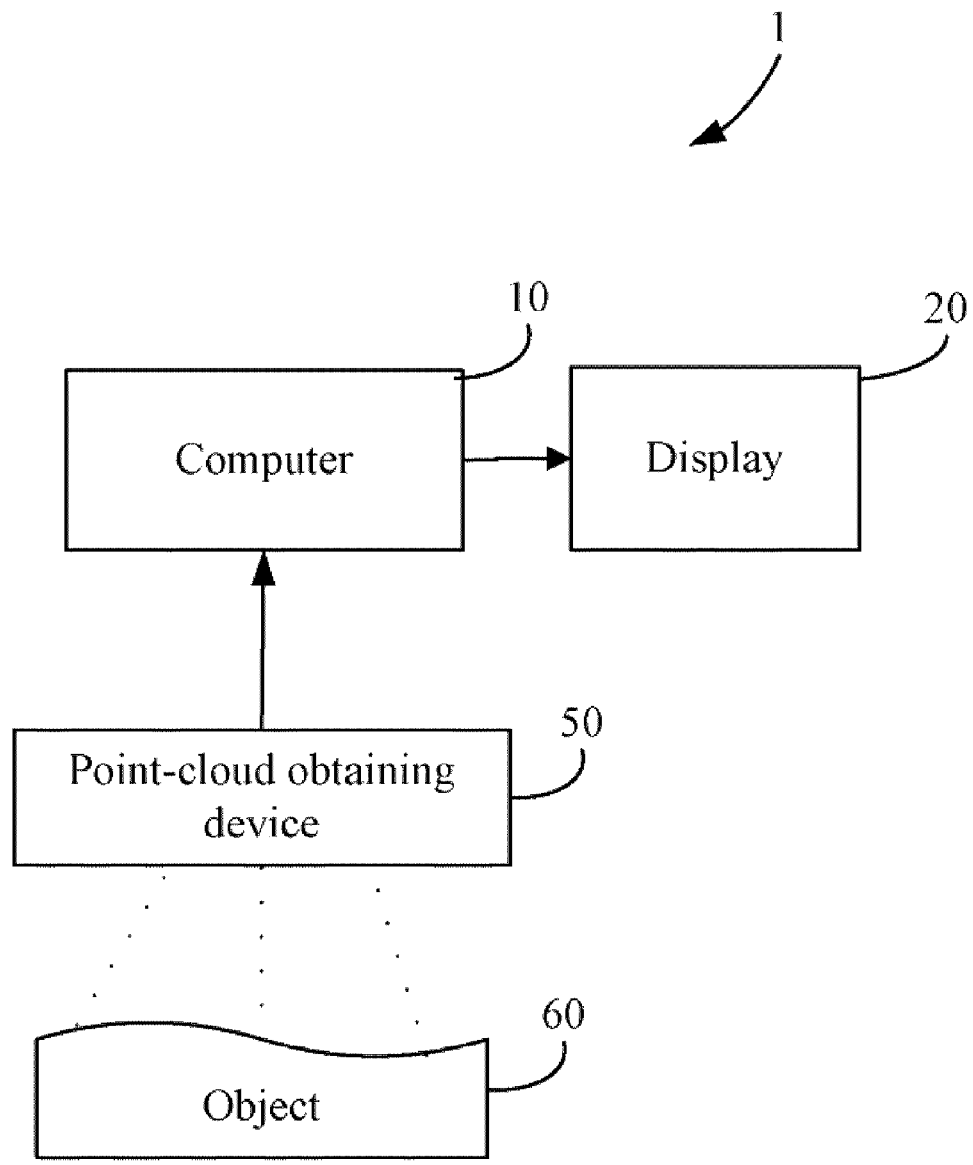
FIG. 1 is a block diagram of one embodiment of a system for fitting feature elements using a point-cloud of an object.

FIG. 1 is a block diagram of one embodiment of a system 1 for fitting feature elements using a point-cloud of an object 60. In one embodiment, the system 1 includes a computer 10 and a point-cloud obtaining device 50. The point-cloud obtaining device 50 can obtain point-clouds of the object 60 by scanning the object 60. A display 20 is connected to the computer 10 to display the point-clouds.

Figure 2:
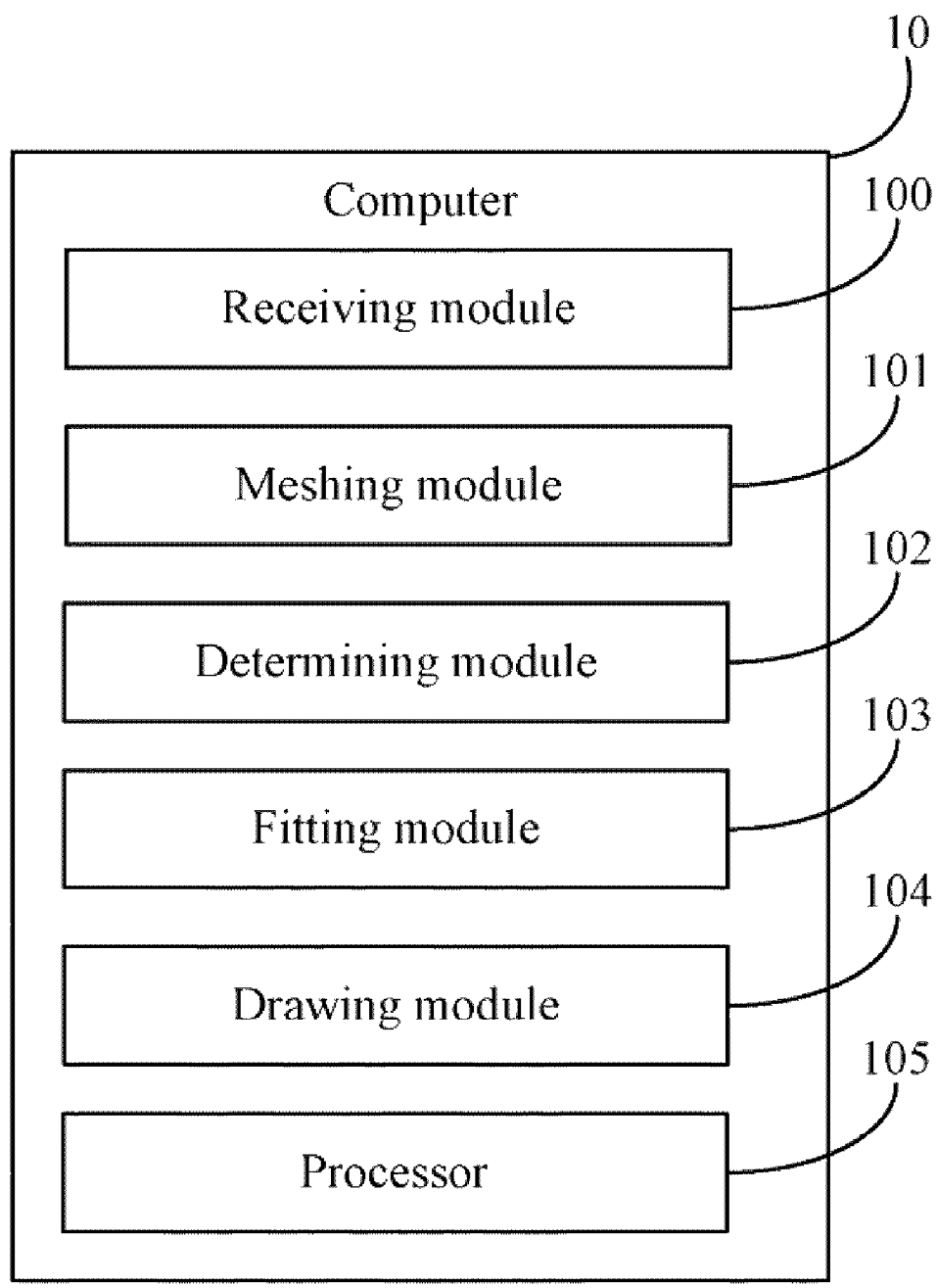
FIG. 2 is a block diagram of one embodiment of function modules of the system in FIG. 1.

FIG. 2 is a block diagram of one embodiment of function modules of the system 1 in FIG. 1. In one embodiment, the function modules of the system 1 include a receiving module 100, a meshing module 101, a determining module 102, a fitting module 103, and a drawing module 104.

In one embodiment, one or more specialized or general purpose processors, such as a processor 105 in the computer 10, may be used to execute one or more computerized instructions for the function modules 100, 101, 102, 103, and 104.

The receiving module 10 is operable to receive the point-cloud of the object 60 from the point-cloud obtaining device 50. It may be understood that, the point-cloud is a set of vertices in a three-dimensional coordinate system. These vertices are usually defined by X, Y, and Z coordinates. The point-cloud is created by the point-cloud obtaining device 50 by scanning and measuring a large number of points on the surface of the object 60, and outputting the point-cloud as a data file. The point-cloud represents the visible surface of the object 60. Thus, the point-cloud may include data such as coordinates of each point of the point-cloud, an identifier (ID) of each point of the point-cloud, and a total number of points of the point-cloud.

The meshing module 101 is operable to construct a triangular mesh surface of the point-cloud. In one embodiment, the meshing module 101 determines a cubical figure that confines the point-cloud, maps a grid on the cubical figure to obtain a plurality of grid squares, and puts the ID of each point of the point-cloud into a corresponding grid square. Furthermore, the meshing module 101 selects a first point from the point-cloud, obtains adjacent grid squares around the first point to select a second point nearest the first point. In addition, the meshing module 101 determines a midpoint of the first point and the second point, obtains grid squares around the midpoint to locate a third point, and constructs a triangle utilizing the first point, the second point and the third point.

Figure 3:
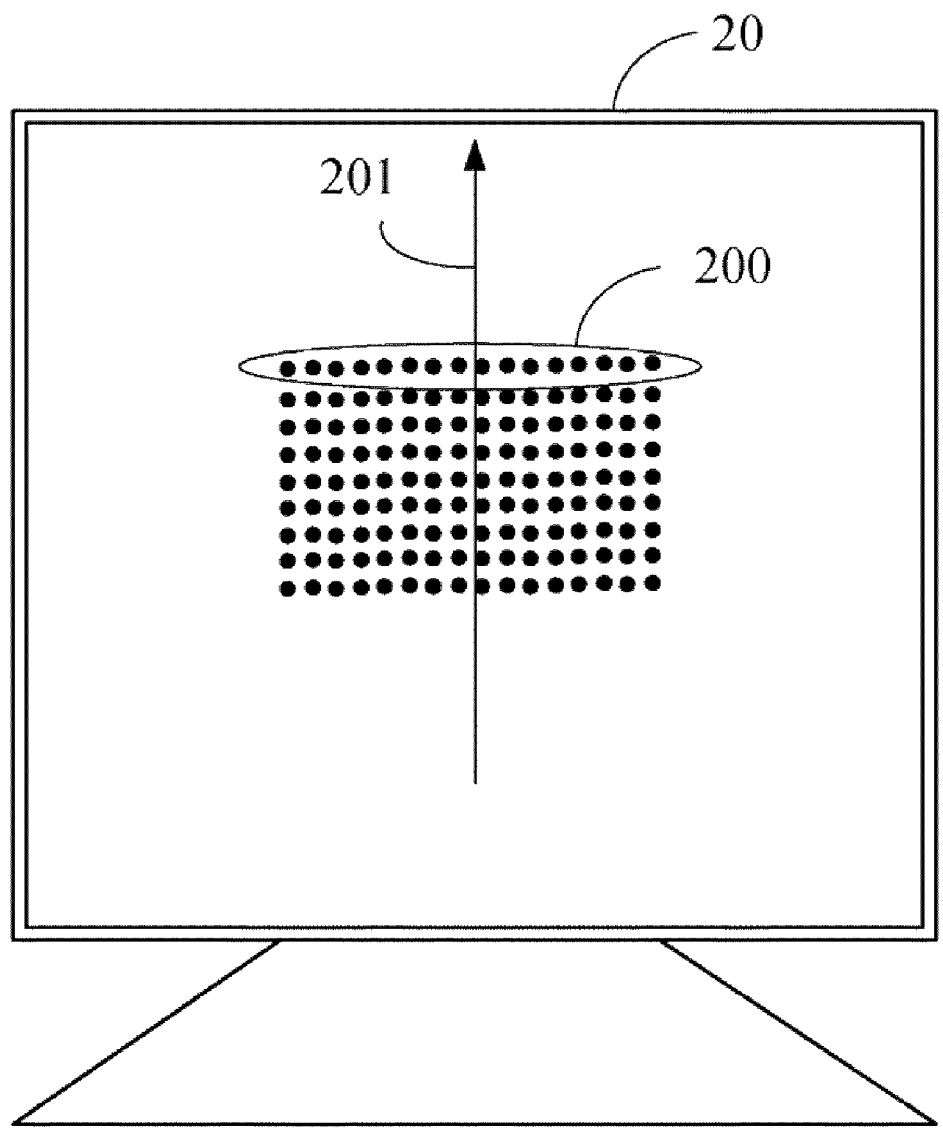
FIG. 3 illustrates an example of uppermost points viewed at front of a display of a computer in FIG. 1.

The determining module 102 is operable to determine a plurality of uppermost boundary points of the triangular mesh surface. In one embodiment, the determining module 102 determines all boundary points of the triangular mesh surface, and determines uppermost points viewed in front of the display 20 from points which are selected from the triangular mesh surface using a closed polygonal chain. Finally, the determining module 102 determines the plurality of uppermost boundary points by comparing the uppermost points with the all boundary points. FIG. 3 illustrates the an example of uppermost points of a point cloud of the object 60 viewed on the display 20. In FIG. 3, number 201 indicates a normal vector of the display 20, and number 200 indicates the uppermost points viewed in front of the display 20.

The fitting module 103 is operable to fit a feature element according to the uppermost boundary points using an iterative method. The iterative method may be the quasi-Newton iterative method. In one embodiment, the feature element may be a line, a plane, a circle, a cylinder, or a sphere.

Figure 4:
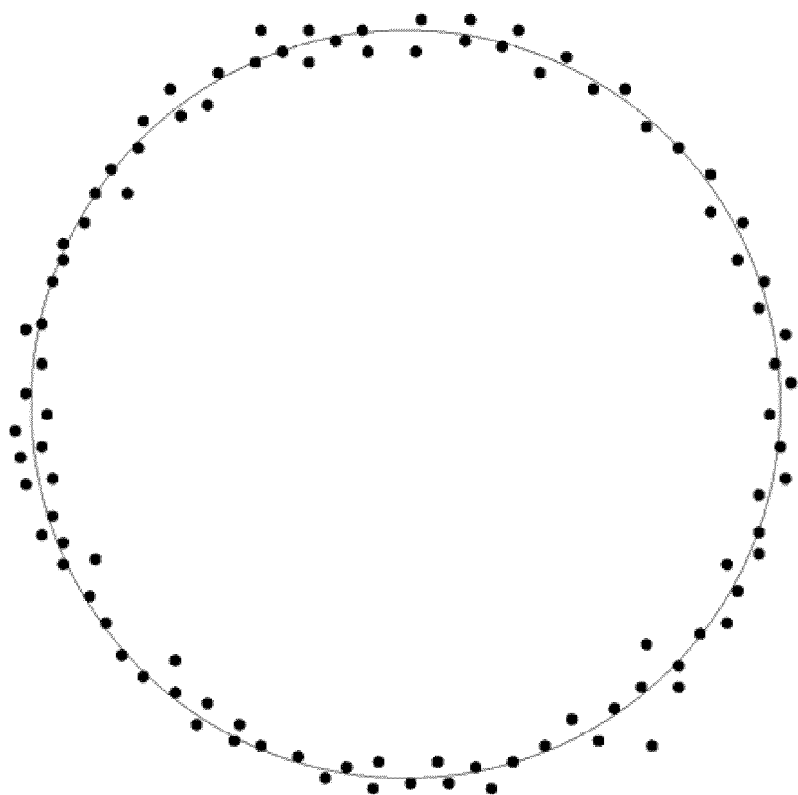
FIG. 4 illustrates an example of a feature element fitted and created according to a set of uppermost boundary points.
Figure 5:
FIG. 5 illustrates another example of a feature element fitted and created according to another set of uppermost boundary points.

The drawing module 104 is operable to create the feature element, and output the feature element to the display 20. FIG. 4 illustrates an example of a feature element fitted and created according to a set of uppermost boundary points. In FIG. 4, the set of uppermost boundary points are distributed around a circle, thus, the feature element "circle" is fitted by the fitting module 103 and created by the drawing module 104. FIG. 5 illustrates another example of a feature element fitted and created according to another set of uppermost boundary points. In FIG. 5, the set of uppermost boundary points are distributed around a line, thus, the feature element "line" is fitted by the fitting module 103 and created by the drawing module 104.

Figure 6:
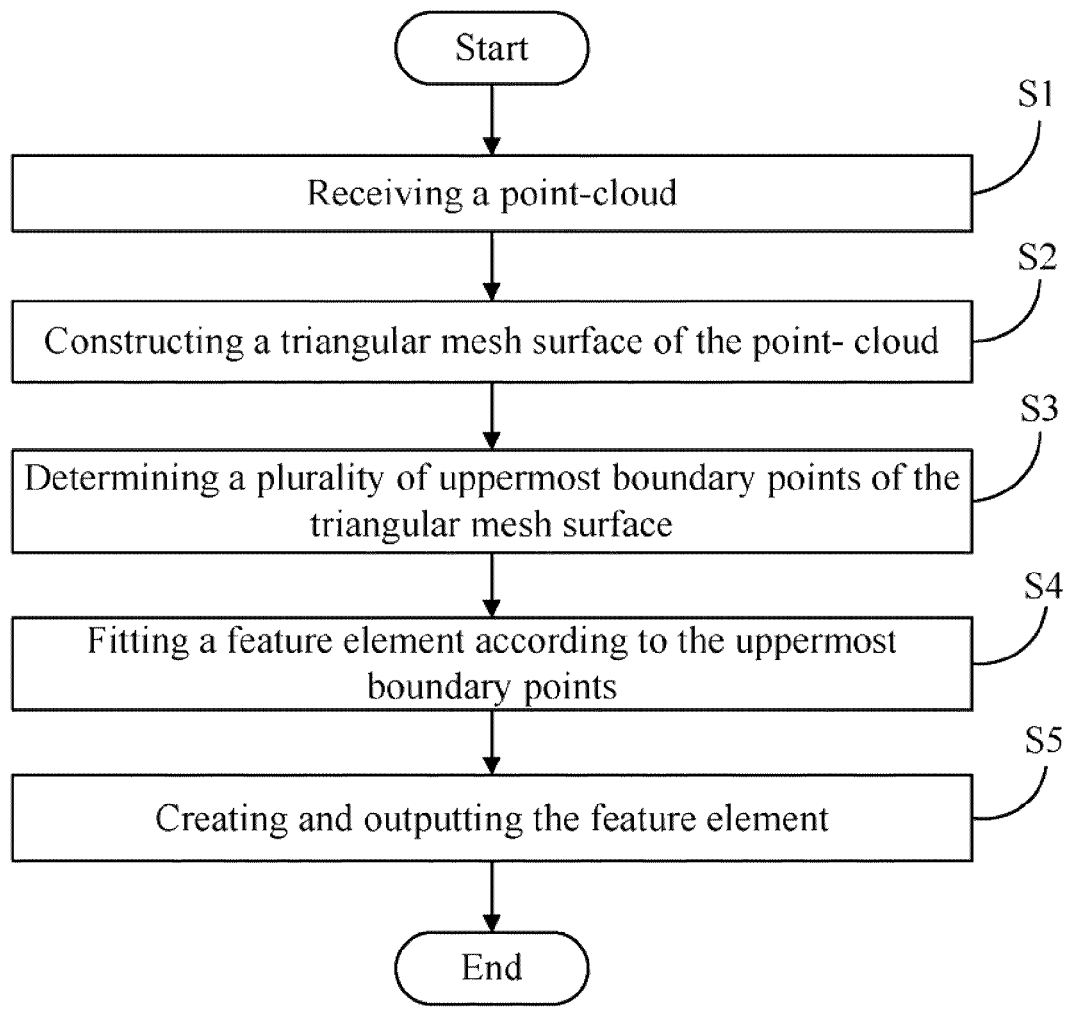
FIG. 6 is a flowchart illustrating one embodiment of a method for fitting feature elements using a point-cloud of an object.

FIG. 6 is a flowchart illustrating one embodiment of a method for fitting feature elements using a point-cloud of an object. Depending on the embodiment, additional blocks in the flow of FIG. 6 may be added, others removed, and the ordering of the blocks may be changed.

In block S1, the receiving module 10 receives the point-cloud of the object 60 from the point-cloud obtaining device 50. The point-cloud may include data such as coordinates of each point, an ID of each point, and a total number of points in the point-cloud.

In block S2, the meshing module 101 constructs a triangular mesh surface of the point-cloud. As mentioned above, the meshing module 101 determines a cubical figure that confines the point-cloud, maps a grid on the cubical figure to obtain a plurality of grid squares, and puts the ID of each point of the point-cloud into a corresponding grid square. Furthermore, the meshing module 101 selects a first point from the point-cloud, obtains adjacent grid squares around the first point to select a second point nearest to the first point. In addition, the meshing module 101 determines a midpoint of the first point and the second point, obtains grid squares around the midpoint to locate a third point, and constructs a triangle utilizing the first point, the second point and the third point.

In block S3, the determining module 102 determines a plurality of uppermost boundary points of the triangular mesh surface. A method for determining the uppermost boundary points will be described below referencing to FIG. 7.

In block S4, the fitting module 103 fits a feature element according to the uppermost boundary points using an iterative method. The iterative method may be the quasi-Newton iterative method. A method for fitting the feature element will be described below referencing to FIG. 9.

In block S5, the drawing module 104 creates the feature element, and outputs the feature element to the display 20.

Figure 7:
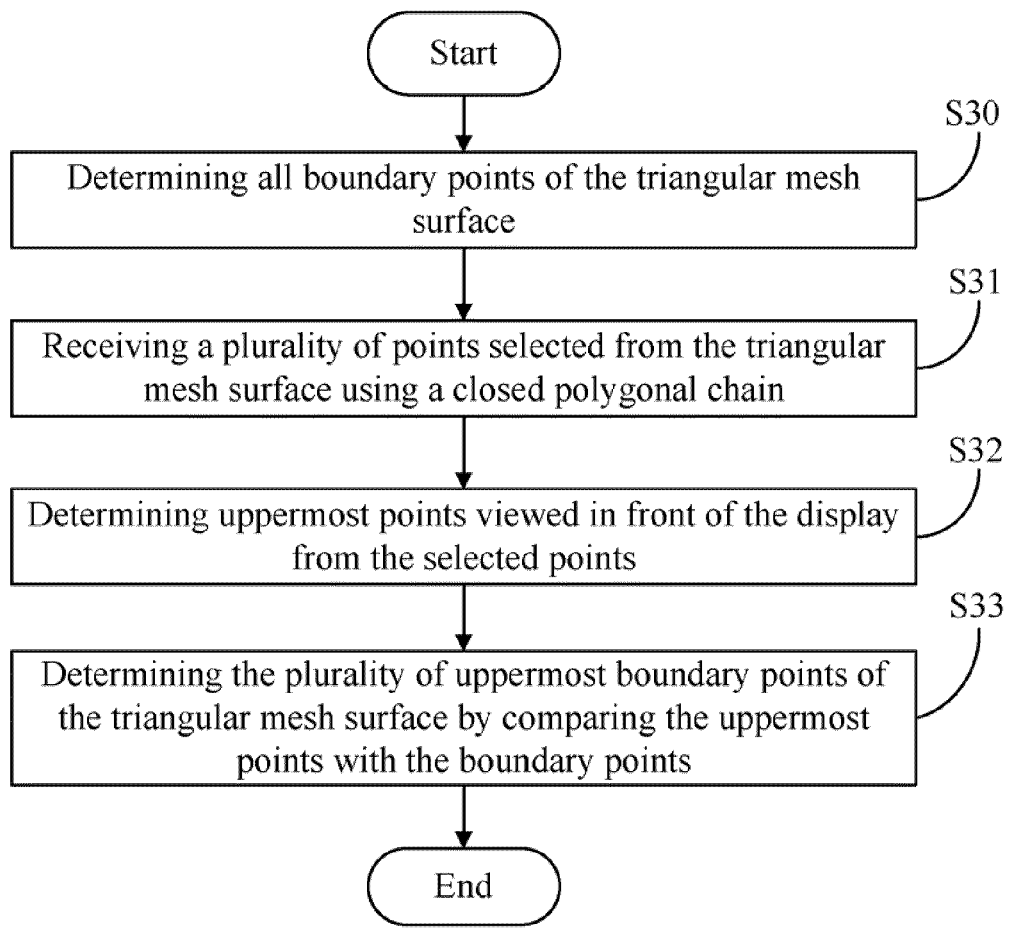
FIG. 7 is a flowchart illustrating one embodiment of a method detailing block S3 of FIG. 6.

FIG. 7 is a flowchart illustrating one embodiment of a method detailing block S3 of FIG. 6. Depending on the embodiment, additional blocks in the flow of FIG. 7 may be added, others removed, and the ordering of the blocks may be changed.

In block S30, the determining module 102 determines all boundary points of the triangular mesh surface. In one embodiment, the determining module 102 selects a point from the triangular mesh surface, and searches for triangles around the selected point. Furthermore, the determining module 102 obtains vertexes of the triangles around the selected point, and determines if there is at least one of the vertexes which belongs to only one of the triangles around the selected point. If the answer is yes, the determining module 102 determines that the selected point is a boundary point of the triangular mesh surface.

In block S31, the determining module 102 receives a plurality of points selected from the triangular mesh surface using a closed polygonal chain. In one embodiment, the selected points are distributed in three-dimensional space.

In block S32, the determining module 102 determines uppermost points viewed in front of the display 20 from the selected points. A method for determining the uppermost points will be described below referring to FIG. 8.

In block S33, the determining module 102 determines the plurality of uppermost boundary points of the triangular mesh surface by comparing the uppermost points with the boundary points. In one embodiment, if the coordinates of the uppermost point is the same as one of the boundary points, the uppermost point is one of the uppermost boundary points.

Figure 8:
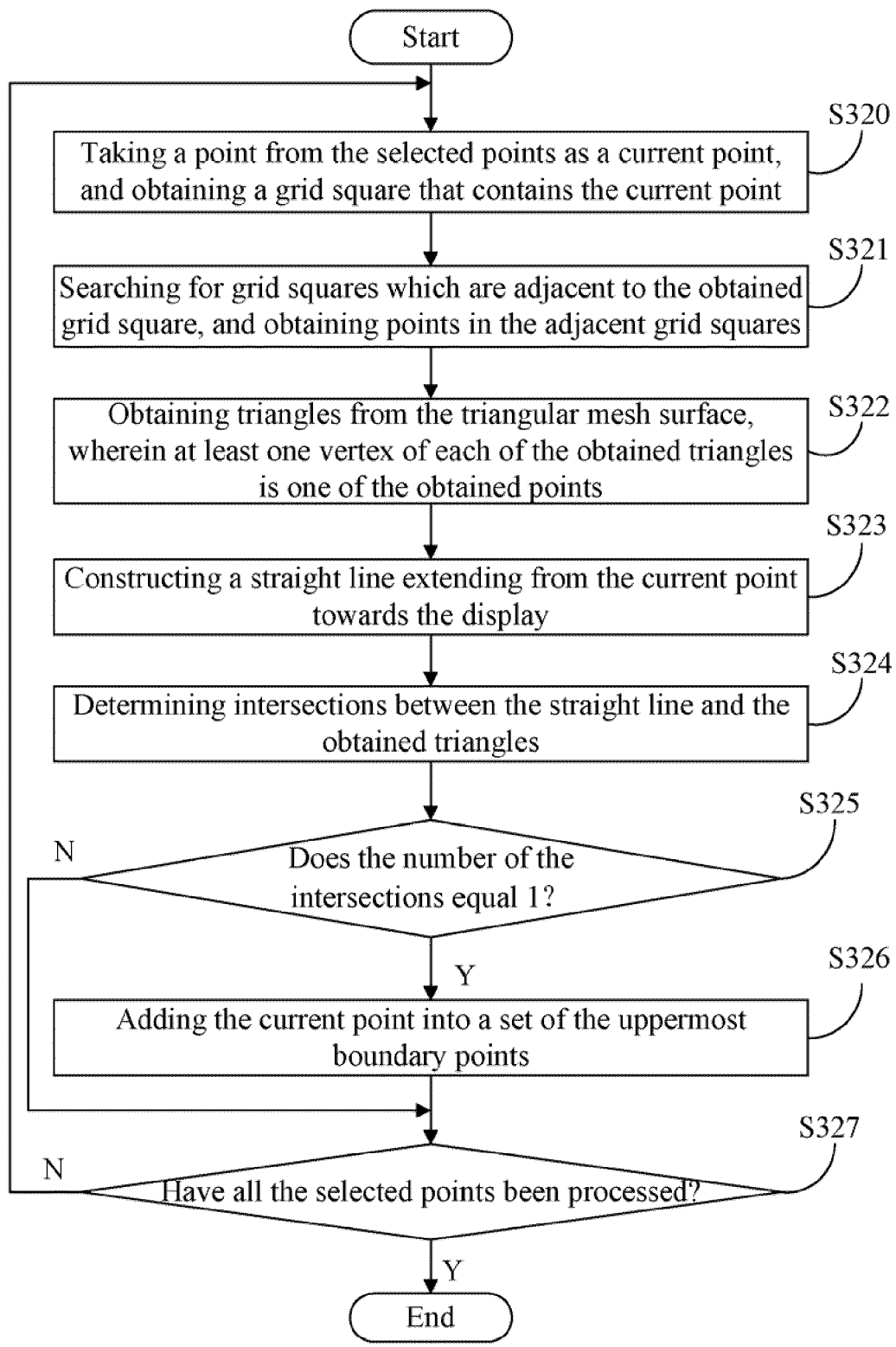
FIG. 8 is a flowchart illustrating one embodiment of a method detailing block S32 of FIG. 7.

FIG. 8 is a flowchart illustrating one embodiment of a method detailing block S32 of FIG. 7. Depending on the embodiment, additional blocks in the flow of FIG. 8 may be added, others removed, and the ordering of the blocks may be changed.

In block S320, the determining module 102 takes a point from the selected points as a current point, and obtains a grid square that contains the current point.

In block S321, the determining module 102 searches for grid squares which are adjacent to the obtained gird square, and obtaining points in the adjacent grid squares. It may be understood that, in three-dimensional space, one grid square has twenty-six adjacent grid squares, in one example.

In block S322, the determining module 102 obtains triangles from the triangular mesh surface, wherein at least one vertex of each of the obtained triangles is one of the obtained points.

In block S323, the determining module 102 constructs a straight line extending from the current point towards and perpendicular to the display 20.

In block S324, the determining module 102 determines intersections between the straight line and the obtained triangles.

In block S325, the determining module 102 determines that if the number of the intersections equals 1. The flow goes to block S326 if the number equals 1. Otherwise, the flow goes directly to block S327 if the number does not equal 1.

In block S326, the determining module 102 adds the current point into a set of the uppermost boundary points.

In block S327, the determining module 102 determines if all the selected points have been processed/analyzed. If any one of the selected points has not been processed/analyzed, the flow returns to block S320 described above. Otherwise, if all the selected points have been processed/analyzed, the flow ends.

Figure 9:
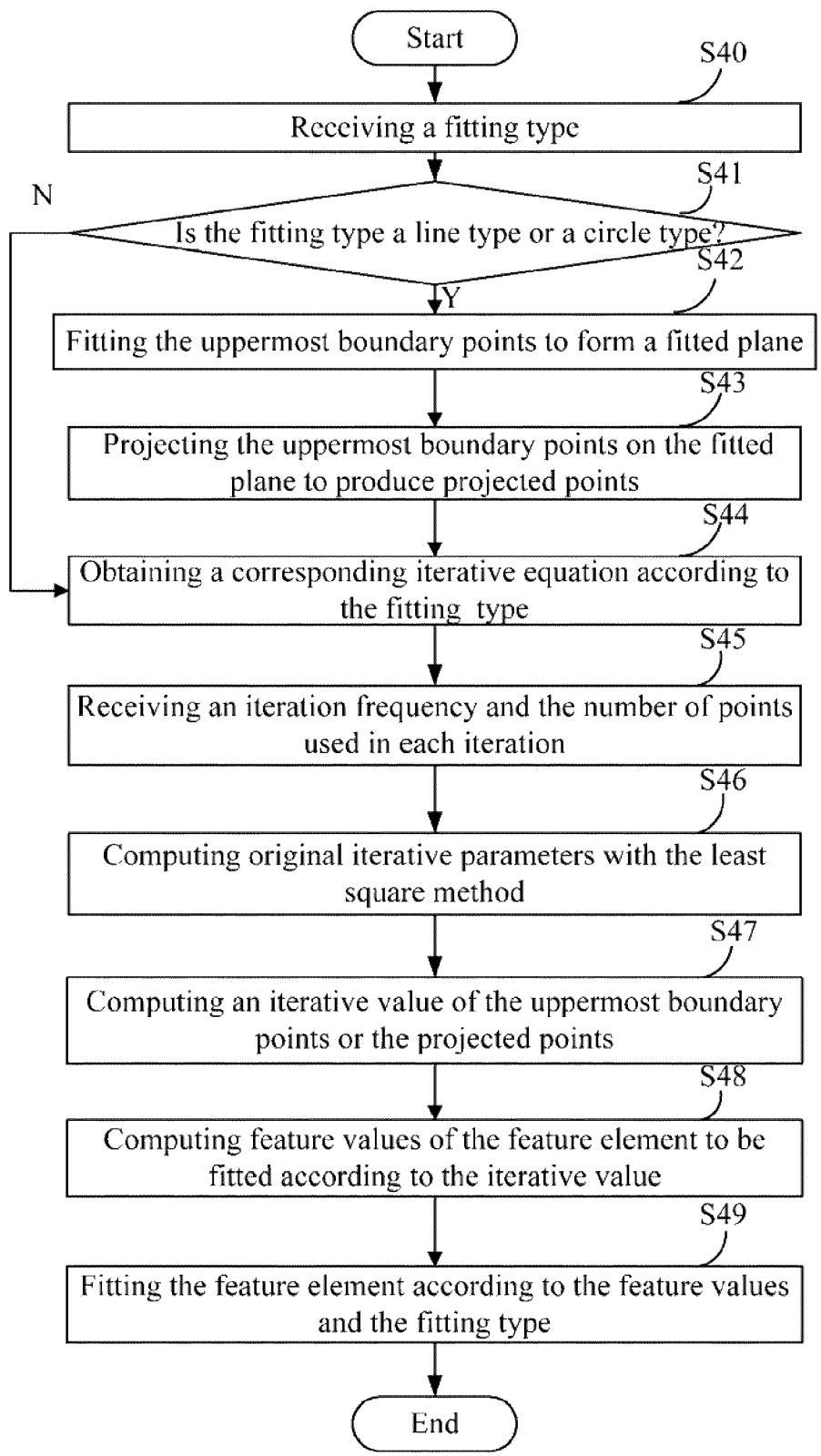
FIG. 9 is a flowchart illustrating one embodiment of a method detailing block S4 of FIG. 6.

FIG. 9 is a flowchart illustrating one embodiment of a method detailing block S4 of FIG. 6. Depending on the embodiment, additional blocks in the flow of FIG. 9 may be added, others removed, and the ordering of the blocks may be changed.

In block S40, the fitting module 103 receives a fitting type of the feature element to be fitted input by a user according to an outline and distribution of the uppermost boundary points. In one embodiment, the fitting type may be a line type, a plane type, a circle type, a cylinder type, or a sphere type.

In block S41, the fitting module 103 determines if the fitting type is a line type or a circle type. If the fitting type is a line type or a circle type, the flow goes to block S42. Otherwise, if the fitting type is not a line type or a circle type, the flow moves directly to block S44.

In block S42, the fitting module 103 fits the uppermost boundary points to form a fitted plane.

In block S43, the fitting module 103 projects the uppermost boundary points on the fitted plane to produce projected points.

In block S44, the fitting module 103 obtains a corresponding iterative equation according to the fitting type from a database. In one embodiment, if the fitting type is a line type, one example of the corresponding iterative equation is as follows:

$$f(x) = \sqrt{\sum_{i=1}^{n} \left(\sqrt{(x_i - x_0)^2 + (y_i - y_0)^2 + (z_i - z_0)^2} * \sin(\alpha)\right)^2 \Big/ n}.$$

If the fitting type is a circle type, one example of the corresponding iterative equation is as follows:

$$f(x) = \min \sqrt{\sum_{i=1}^{n} \left(\sqrt{(x_i - x_0)^2 + (y_i - y_0)^2} - R\right)^2 / n}.$$

If the fitting type is a plane type, one example of the corresponding iterative equation is as follows:

$$f(x) = \min \sqrt{\sum_{i=1}^{n} \left(\frac{Ax_i + By_i + Cz_i + D}{\sqrt{A^2 + B^2 + C^2}}\right)^2 / n}.$$

If the fitting type is a cylinder type, one example of the corresponding iterative equation is as follows:

$$f(x) = \min \sqrt{\sum_{i=1}^{n} \left(\sqrt{(x_i - x_0)^2 + (y_i - y_0)^2 + (z_i - z_0)^2} * \sin(\alpha) - R\right)^2 / n}.$$

If the fitting type is sphere type, one example of the corresponding iterative equation is as follows:

$$f(x) = \min \sqrt{\sum_{i=1}^{n} \left(\sqrt{(x_i - x_0)^2 + (y_i - y_0)^2 + (z_i - z_0)^2} - R\right)^2 / n}.$$

In block S45, the fitting module 103 receives an iteration frequency N and the number of points used in each iteration. In one embodiment, if N=3, the number of points in a first iteration may be the number of the uppermost boundary points or the projected points multiply by ten percent, the number of points in a second iteration may be the number of the uppermost boundary points or the projected points multiply by fifty percent, and the number of points in a third iteration is the number of the uppermost boundary points or the projected points.

In block S46, the fitting module 103 computes original iterative parameters using the uppermost boundary points or the projected points with the least square method. In one embodiment, if the fitting type is a line type, the original iterative parameters may include coordinates of a start point and an end point; if the fitting type is a circle type, the original iterative parameters may include coordinates of the center; if the fitting type is a sphere type, the original iterative parameters may include coordinates of the center; if the fitting type is a cylinder type, the original iterative parameters may include coordinates of a start point and an end point of the central axis; and if the fitting type is a plane type, the original iterative parameters may include dimensional position and a normal vector.

In block S47, the fitting module 103 computes an iterative value of the uppermost boundary points or the projected points. The iterative value is a distance between the uppermost boundary points or the projected points and the feature element to be fitted. In one embodiment, the iterative value more approaches to 0, the feature element is more accurate. A method for computing the iterative value will be described below referring to FIG. 10.

In block S48, the fitting module 103 computes feature values of the feature element to be fitted according to the iterative value. As mentioned above, if the feature element to be fitted is a line, the feature values may include coordinates of a start point and an end point; if the feature element to be fitted is a circle, the feature values include coordinates of the center; if the feature element to be fitted is a sphere, the feature values include coordinates of the center; if the feature element to be fitted is a cylinder, the feature values include coordinates of a start point and an end point of the central axis; and if the feature element to be fitted is a plane, the feature values include dimensional position and a normal vector.

In block S49, the fitting module 103 fits the feature element according to the feature values and the fitting type.

Figure 10:
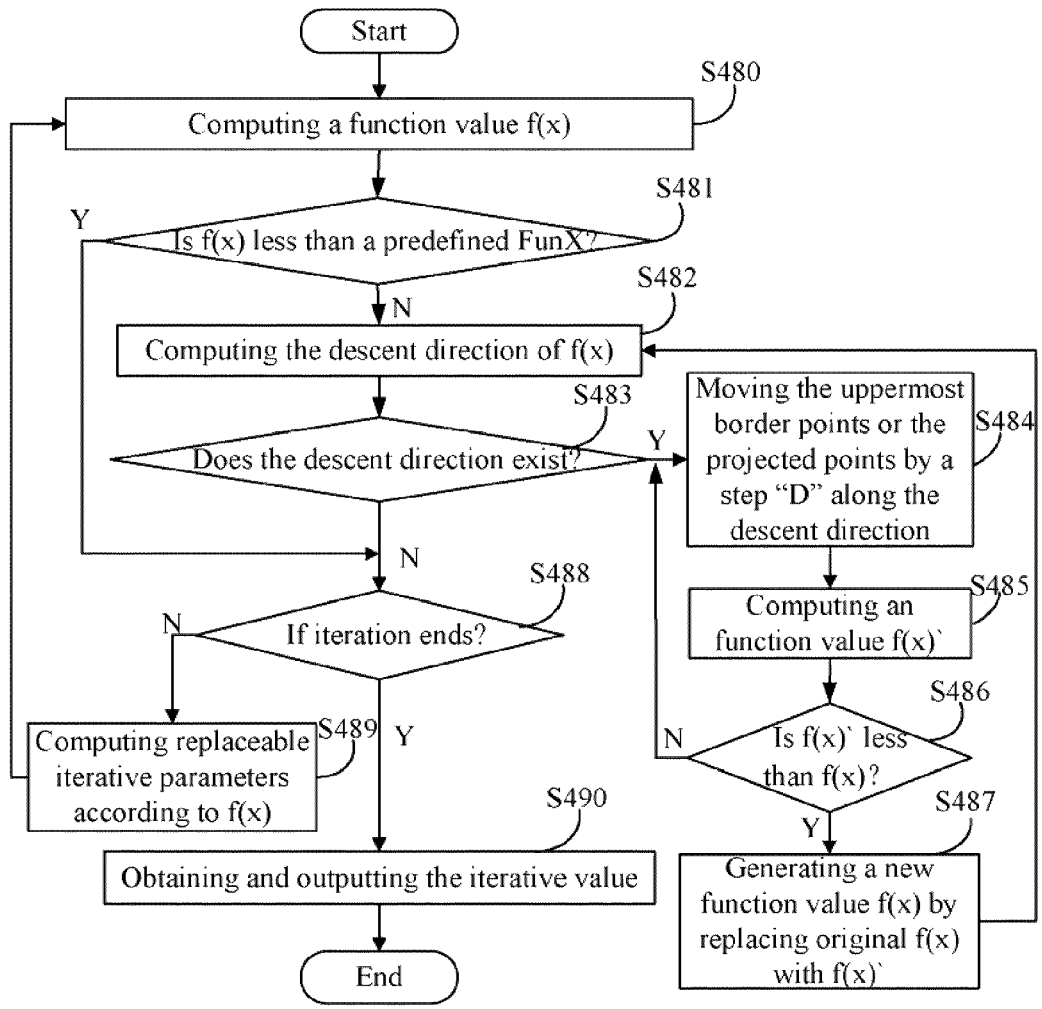
FIG. 10 is a flowchart illustrating one embodiment of a method detailing block S47 of FIG. 9.

FIG. 10 is a flowchart illustrating one embodiment of a method detailing block S47 of FIG. 9. Depending on the embodiment, additional blocks in the flow of FIG. 10 may be added, others removed, and the ordering of the blocks may be changed.

In block S480, the fitting module 103 computes a function value f(x) according to iterative parameters, a part of the uppermost boundary points or the projected points, and the corresponding iterative equation. In the first iteration, the iterative parameters is the original iterative parameters, and if the iteration frequency N=3, the part is ten percent of the uppermost boundary points or the projected points.

In block S481, the fitting module 103 determines if f(x) is less than the a predefined accuracy FunX. If f(x) is less than FunX, then the flow moves to block S488.

Otherwise, if f(x) is not less than FunX, in block S482, then the f(x) the fitting module 103 computes a descent direction of f(x). It may be understood that, the descent direction of f(x) is a direction toward which the value of f(x) decreases.

In block S483, the fitting module 103 determines whether the descent direction of f(x) exists. If the descent direction of f(x) doesn't exist, the flow goes to block S488.

Otherwise, if the descent direction of f(x) exists, in block S484, the fitting module 103 moves the uppermost boundary points or the projected points by a step D along the descent direction.

In block S485, the fitting module 103 computes a function value f(x)' after movement of the uppermost boundary points or the projected points.

In block S486, the fitting module 103 determines if f(x)' is less than f(x). Otherwise, if f(x)' is not less than f(x), then the flow returns to block S484.

If f(x)' is less than f(x), in block S487, the fitting module 103 generates a new function value f(x) by replacing original f(x) with f(x)'. After block S487, the flow returns to block S482 described above.

If in block S483, the fitting module 103 determines that the descent direction of f(x) doesn't exist, then in block S488, the fitting module 103 further determines if iteration ends. It may be understood that, if a number of the iteration has reached the iteration frequency N, the iteration ends. Otherwise, if a number of the iteration has not reached the iteration frequency N, the iteration does not end, and the flow goes to block S489.

If the iteration does not end, in block S489, the fitting module 103 computes replaceable iterative parameters according to f(x). The replaceable iterative parameters are corresponding to the original iterative parameters. For example, as mentioned above, if the feature element to be fitted is a line, the replaceable iterative parameters may include coordinates of a start point and an end point; if the feature element to be fitted is a circle, the replaceable iterative parameters may include coordinates of the center and a radius of the circle, and so on. After block S489, the flow returns to block S480 described above to execute the second iteration.

In the second iteration, the iterative parameters is the replaceable iterative parameters, and the part may be fifty percent of the uppermost boundary points or the projected points.

If the iteration ends, in block S490, the fitting module 103 obtains and outputs the iterative value, namely the function value f(x).

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based method for fitting feature elements using a point-cloud of an object, the method being executed by one or more processors of the computer, and the method comprising:
   receiving the point-cloud of the object from a point-cloud obtaining device by one of the processors;
   constructing a triangular mesh surface of the point-cloud by one of the processors;
   determining a plurality of uppermost boundary points of the triangular mesh surface by one of the processors;
   fitting a feature element according to the uppermost boundary points by one of the processors, comprising:
      receiving a fitting type of the feature element;
      fitting the uppermost boundary points to form a fitted plane upon condition that the fitting type is a line type or a circle type, and projecting the uppermost boundary points on the fitted plane to produce projected points;
      obtaining a corresponding iterative equation according to the fitting type;
      receiving an iteration frequency N and a number of points used in each iteration;
      computing original iterative parameters using the uppermost boundary points or the projected points with a least square method;
      computing an iterative value of the uppermost boundary points or the projected points according to the original iterative parameters and the corresponding iterative equation;
      computing feature values of the feature element to be fitted according to the iterative value; and
      fitting the feature element according to the feature values and the fitting type; and
   creating the feature element by one of the processors and outputting the feature element to a display.

2. The method as described in claim 1, wherein the point-cloud is a data file comprising coordinates of each point of the point-cloud, an identifier of each point of the point-cloud, and a total number of the points of the point-cloud.

3. The method as described in claim 2, wherein constructing a triangular mesh surface of the point-cloud comprises:
   determining a cubical figure that confines the point-cloud;
   mapping a grid on the cubical figure to obtain a plurality of grid squares;
   putting the identifier of each point of the point-cloud into a corresponding grid square;
   selecting a first point from the point-cloud, and obtaining grid squares around the first point;
   acquiring a second point which is nearest to the first point in the grid squares around the first point, and determining a midpoint of the first point and the second point; and
   obtaining grid squares around the midpoint to locate a third point, and constructing a triangle utilizing the first point, the second point, and the third point.

4. The method as described in claim 3, wherein determining a plurality of uppermost boundary points of the triangular mesh surface comprises:
   (A) selecting a point from the triangular mesh surface, and searching for triangles around the point;
   (B) obtaining vertexes of the triangles around the point;
   (C) determining the point is a boundary point of the triangular mesh surface upon condition that at least one of the vertexes belongs to only one of the triangles around the point;
   (D) repeating the step (A) to step (C) till all the points in the triangular mesh surface are selected;
   (E) receiving a plurality of points selected from the triangular mesh surface using a closed polygonal chain;
   (F) determining uppermost points viewed in front of the display from the selected points; and
   (G) determining the plurality of uppermost boundary points of the triangular mesh surface by comparing the uppermost points with the boundary points.

5. The method as described in claim 4, wherein the step (F) comprises:
   taking a point from the selected points as a current point, and obtaining a grid square that contains the current point;
   searching for grid squares which are adjacent to the obtained grid square and obtaining points in the adjacent grid squares;
   obtaining triangles from the triangular mesh surface, wherein at least one vertex of each of the obtained triangles is one of the obtained points;
   constructing a straight line extending from the current point towards and perpendicular to the display;
   determining intersections between the straight line and the obtained triangles; and
   adding the current point into a set of the uppermost boundary points upon condition that a number of the intersections equals 1.

6. The method as described in claim 1, wherein the fitting type is selected from a group consisting of the line type, a plane type, the circle type, a cylinder type, and a sphere type.

7. The method as described in claim 1, wherein computing an iterative value comprises:
   (a) computing a function value f(x) according to iterative parameters, part of the uppermost boundary points or the projected points, and the corresponding iterative equation, wherein the iterative parameters are the original iterative parameters;
   (b) computing a descent direction of f(x) upon condition that f(x) is not less than a predefined value FunX;
   (c) moving the uppermost boundary points or the projected points by a step D along the descent direction upon condition that the descent direction of f(x) exists;
   (d) computing a function value f(x)' after the movement of the uppermost boundary points or the projected points;
   (e) generating a new function value f(x) by replacing original f(x) with f(x)' upon condition that f(x)' is less than f(x), or return to (c) upon condition that f(x)' is not less than f(x);
   (f) computing replaceable iterative parameters according to f(x) upon condition that the iteration does not end, and returning to (a) to execute a next iteration, wherein the iterative parameters are the replaceable iterative parameters; and
   (g) obtaining and outputting the iterative value upon condition that the iteration ends, wherein the iterative value is the function value f(x).

8. The method as described in claim 7, wherein the iterative parameters comprise coordinates of a start point and an end point upon condition that the fitting type is a line type, or comprise coordinates of a center upon condition that the fitting type is a circle type or a sphere type, or comprise coordinates of a start point and an end point of a central axis upon condition that the fitting type is a cylinder type, or comprise a dimensional position and a normal vector upon condition that the fitting type is a plane type.

9. A non-transitory storage medium having stored thereon instructions that, when executed by a processor, causes the processor to perform a method for fitting feature elements using a point-cloud of an object, the method comprising:

receiving the point-cloud of the object from a point-cloud obtaining device;

constructing a triangular mesh surface of the point-cloud;

determining a plurality of uppermost boundary points of the triangular mesh surface;

fitting a feature element according to the uppermost boundary points, comprising:

receiving a fitting type of the feature element;

fitting the uppermost boundary points to form a fitted plane upon condition that the fitting type is a line type or a circle type, and projecting the uppermost boundary points on the fitted plane to produce projected points;

obtaining a corresponding iterative equation according to the fitting type;

receiving an iteration frequency N and a number of points used in each iteration;

computing original iterative parameters using the uppermost boundary points or the projected points with a least square method;

computing an iterative value of the uppermost boundary points or the projected points according to the original iterative parameters and the corresponding iterative equation;

computing feature values of the feature element to be fitted according to the iterative value; and fitting the feature element according to the feature values and the fitting type; and creating the feature element, and outputting the feature element to a display.

10. The storage medium as described in claim 9, wherein constructing a triangular mesh surface of the point-cloud comprises:

determining a cubical figure that confines the point-cloud;

mapping a grid on the cubical figure to obtain a plurality of grid squares;

putting an identifier of each point of the point-cloud into a corresponding grid square;

selecting a first point from the point-cloud, and obtaining grid squares around the first point;

acquiring a second point which is nearest to the first point in the grid squares around the first point, and determining a midpoint of the first point and the second point; and obtaining grid squares around the midpoint to locate a third point, and constructing a triangle utilizing the first point, the second point, and the third point.

11. The storage medium as described in claim 10, wherein determining a plurality of uppermost boundary points of the triangular mesh surface comprises:

(A) selecting a point from the triangular mesh surface, and searching for triangles around the point;

(B) obtaining vertexes of the triangles around the point;

(C) determining the point is a boundary point of the triangular mesh surface upon condition that at least one of the vertexes belongs to only one of the triangles around the point;

(D) repeating the step (A) to step (C) till all the points in the triangular mesh surface are selected;

(E) receiving a plurality of points selected from the triangular mesh surface using a closed polygonal chain;

(F) determining uppermost points viewed at front of the display from the selected points; and (G) determining the plurality of uppermost boundary points of the triangular mesh surface by comparing the uppermost points with the boundary points.

12. The storage medium as described in claim 11, wherein the step (F) comprises:

taking a point from the selected points as a current point, and obtaining a grid square that contains the current point;

searching for grid squares which are adjacent to the obtained grid square, and obtaining points in the adjacent grid squares;

obtaining triangles from the triangular mesh surface, wherein at least one vertex of each of the obtained triangles is one of the obtained points;

constructing a straight line extending from the current point towards and perpendicular to the display;

determining intersections between the straight line and the obtained triangles; and adding the current point into a set of the uppermost boundary points upon condition that a number of the intersections equals 1.

13. The storage medium as described in claim 9, wherein the fitting type is selected from a group consisting of the line type, a plane type, the circle type, a cylinder type, and a sphere type.

14. The storage medium as described in claim 9, wherein computing an iterative value comprises:

(a) computing a function value f(x) according to iterative parameters, part of the uppermost boundary points or the projected points, and the corresponding iterative equation, wherein the iterative parameters are the original iterative parameters;

(b) computing a descent direction of f(x) upon condition that f(x) is not less than a predefined value FunX;

(c) moving the uppermost boundary points or the projected points by a step D along the descent direction upon condition that the descent direction of f(x) exists;

(d) computing a function value f(x)' after the movement of the uppermost boundary points or the projected points;

(e) generating a new function value f(x) by replacing original f(x) with f(x)' upon condition that f(x)' is less than f(x), or return to (c) upon condition that f(x)' is not less than f(x);

(f) computing replaceable iterative parameters according to f(x) upon condition that the iteration does not end, and returning to (a) to execute a next iteration, wherein the iterative parameters are the replaceable iterative parameters; and (g) obtaining and outputting the iterative value upon condition that the iteration ends wherein the iterative value is the function value f(x).

15. The storage medium as described in claim 14, wherein the iterative parameters comprise coordinates of a start point and an end point upon condition that the fitting type is a line type, or comprise coordinates of a center upon condition that the fitting type is a circle type or is a sphere type, or comprise coordinates of a start point and an end point of a central axis upon condition that the fitting type is a cylinder type, or comprise a dimensional position and a normal vector upon condition that the fitting type is a plane type.

16. A computing system for fitting feature elements using a point-cloud of an object, comprising:
- a receiving module operable to receive the point-cloud of the object from a point-cloud obtaining device;
- a meshing module operable to construct a triangular mesh surface of the point-cloud;
- a determining module operable to determine a plurality of uppermost boundary points of the triangular mesh surface;
- a fitting module operable to fit a feature element according to the uppermost boundary points using an iterative method by:
  - receiving a fitting type of the feature element;
  - fitting the uppermost boundary points to form a fitted plane upon condition that the fitting type is a line type or a circle type, and projecting the uppermost boundary points on the fitted plane to produce projected points;
  - obtaining a corresponding iterative equation according to the fitting type;
  - receiving an iteration frequency N and a number of points used in each iteration;
  - computing original iterative parameters using the uppermost boundary points or the projected points with a least square method;
  - computing an iterative value of the uppermost boundary points or the projected points according to the original iterative parameters and the corresponding iterative equation;
  - computing feature values of the feature element to be fitted according to the iterative value; and
  - fitting the feature element according to the feature values and the fitting type;
- a drawing module operable to create the feature element according to fitting parameters, and output the feature element to a display; and
- a processor that executes the receiving module, the meshing module, the determining module, the fitting module, and the drawing module.

17. The computing system as described in claim 16, wherein the feature element is selected from a group consisting of a line, a plane, a circle, a cylinder, and a sphere.

18. The computing system as described in claim 16, wherein the iterative method is a quasi-Newton iterative method.

* * * * *